(12) United States Patent
Kubota et al.

(10) Patent No.: US 7,250,462 B2
(45) Date of Patent: Jul. 31, 2007

(54) AMPHOTERIC WATER-SOLUBLE POLYMER DISPERSION AND USE THEREOF

(75) Inventors: Isamu Kubota, Tokyo (JP); Hiroyuki Koshio, Tokyo (JP)

(73) Assignee: Hymo Corporation, Tokyo (JP)

( * ) Notice: Subject to any disclaimer, the term of this patent is extended or adjusted under 35 U.S.C. 154(b) by 0 days.

(21) Appl. No.: 10/480,392

(22) PCT Filed: May 28, 2002

(86) PCT No.: PCT/JP02/05166

§ 371 (c)(1),
(2), (4) Date: Jan. 27, 2004

(87) PCT Pub. No.: WO02/100944

PCT Pub. Date: Dec. 19, 2002

(65) Prior Publication Data

US 2004/0132896 A1    Jul. 8, 2004

(30) Foreign Application Priority Data

Jun. 11, 2001    (JP) .............................. 2001-175222

(51) Int. Cl.
*C08F 2/16* (2006.01)
*C08L 13/02* (2006.01)
*B01D 21/01* (2006.01)

(52) U.S. Cl. ................. 524/458; 526/287; 526/288; 526/307.3; 526/307.4; 526/307.5; 526/307.6; 526/312; 210/732; 210/733; 210/734

(58) Field of Classification Search ............... 526/287, 526/288, 307.3, 307.4, 307.5, 307.6, 312; 524/458; 210/732, 733, 734
See application file for complete search history.

(56) References Cited

U.S. PATENT DOCUMENTS

| | | | | |
|---|---|---|---|---|
| 5,639,841 A * | 6/1997 | Jenkins | ......................... | 526/333 |
| 5,708,071 A | 1/1998 | Takeda | ......................... | 524/458 |
| 5,846,433 A * | 12/1998 | Sorensen et al. | ............ | 210/709 |
| 5,985,992 A * | 11/1999 | Chen | ......................... | 524/814 |
| 6,187,853 B1 * | 2/2001 | Takeda et al. | ............... | 524/457 |
| 6,217,778 B1 * | 4/2001 | Shing et al. | ................. | 210/708 |
| 6,365,052 B1 * | 4/2002 | Sivakumar et al. | .......... | 210/728 |
| 6,590,051 B1 * | 7/2003 | Carter et al. | ................. | 526/258 |
| 7,001,953 B2 * | 2/2006 | Chen et al. | .................. | 525/242 |
| 2002/0188040 A1 * | 12/2002 | Chen et al. | | |

FOREIGN PATENT DOCUMENTS

| | | |
|---|---|---|
| EP | 0735186 | 2/1996 |
| EP | 0 877 120 A1 | 11/1998 |
| EP | 0877120 | 11/1998 |
| JP | 53-149292 | 12/1978 |
| JP | 62-205112 | 9/1987 |
| JP | 64-85199 A | 3/1989 |
| JP | 2-105809 A | 4/1990 |
| JP | 5-78997 A | 3/1993 |
| JP | 7-188349 A | 7/1995 |
| JP | 7-256299 | 10/1995 |
| JP | 7-256300 | 10/1995 |
| JP | 8-225621 A | 9/1996 |
| JP | 08-283349 | * 10/1996 |
| JP | 08283349 | 10/1996 |
| JP | 9-78487 A | 3/1997 |
| JP | 9-78488 A | 3/1997 |
| JP | 10-500 A | 1/1998 |
| JP | 10-137800 A | 5/1998 |
| JP | 10-244300 A | 9/1998 |
| JP | 2001-140191 A | 5/2001 |
| JP | 2001179300 | 7/2001 |

* cited by examiner

*Primary Examiner*—Helen L Pezzuto
(74) *Attorney, Agent, or Firm*—Weingarten, Schurgin, Gagnebin & Lebovici LLP

(57) ABSTRACT

The invention relates to an amphoteric water-soluble polymer dispersion containing polymer particles with particle diameters of 100 μm or smaller and produced by dispersion-copolymerization of a monomer mixture comprising a methacrylate monomer containing a quaternary ammonium salt group, an acrylate monomer containing a quaternary ammonium salt group, an anionic monomer, and a (meth)acrylamide in respectively ratios specified in an aqueous salt solution in the presence of a polymer dispersant soluble in the aqueous salt solution and the invention also relates to a dewatering agent for organic sludge, a pretreatment agent or yield improver for paper making raw materials, and/or a drainage properties-enhancing agent using the amphoteric water-soluble polymer.

8 Claims, No Drawings

1

AMPHOTERIC WATER-SOLUBLE POLYMER DISPERSION AND USE THEREOF

TECHNICAL FIELD

The invention relates to an amphoteric water-soluble polymer dispersion and more particularly to a dispersion of an amphoteric water-soluble polymer produced by copolymerizing a cationic monomer, an anionic monomer and a nonionic monomer respectively specified in an aqueous salt solution and the invention also relates to the use of the amphoteric water-soluble polymer as a dewatering agent of organic sludge, a pretreatment agent or retention rate improver for raw materials of paper making, and/or a drainage properties-enhancing agent.

BACKGROUND ART

An amphoteric water-soluble polymer has been used as a water treatment agent in fields relevant to sludge dewatering treatment, retention rate improvers for raw materials of paper making, and the like. For example, with respect to sludge dewatering treatment, because of increase of the generation quantity of sludge and deterioration of sludge properties in these years, conventional cationic polymer dewatering agents are limited in the capabilities of treating sludge and are not necessarily capable of promoting treatment to a satisfactory extent in terms of the water content of a dewatered cake, the SS recovery ratio, the release property of the cake from a filter cloth, and the like, and thus it is urgent to improve the agents. In order to overcome the defects of such conventional cationic polymer dewatering agents, a variety of amphoteric polymer dewatering agents have been proposed, however these amphoteric polymer dewatering agents are not necessarily satisfactory. For example, (1) an amphoteric polymer dewatering agent having a tertiary amino group (Japanese Patent Application Laid-Open (JP-A) No. 62-205112), (2) an amphoteric polymer dewatering agent having a quaternary ammonium group (JP-A No. 53-149292), and (3) an amphoteric polymer dewatering agent having both tertiary and quaternary groups (JP-A No. 3-18900) are disclosed.

However, with respect to the foregoing amphoteric polymer dewatering agent (1), although it is excellent in flocculation property as compared with the conventional cationic polymer dewatering agent and forms large flocculated flock, its capability is considerably deteriorated for the sludge with high pH such as digestion sledges of wastewater and night soil since the tertiary amino group is not dissociated in a high pH range and it is significantly affected by fluctuation of the sludge properties such as the sludge concentration as well as pH and incapable of promoting stable treatment and it is also disadvantageous in terms of product stability in powder or solution state as compared with the conventional cationic polymer dewatering agent. With respect to the foregoing amphoteric polymer dewatering agent (2), although it is good in terms of the product stability as compared with the amphoteric polymer dewatering agent having a tertiary amino group and has high flocculation capability as compared with the conventional cationic polymer dewatering agent, it has many disadvantageous points to be improved: it is required to add them in a large quantity: the water contents of resulting cakes are high: separation property of cakes from filter cloths is inferior: and so forth. On the other hand, the foregoing amphoteric polymer dewatering agent (3) is improved in the disadvantageous properties which the agents (1) and (2) have, however it is not yet satisfactory in terms of the required addition quantity and the water content in cakes. Further, JP-A No. 7-256299 discloses an amphoteric polymer dewatering agent having a high methacrylate content and cationic group content, and especially JP-A No. 7-256300 discloses an amphoteric polymer dewatering agent having a high methacrylate content and anionic group content. Various polymers as sludge dewatering agents have been developed; nevertheless, there are still many problems to be solved for practical use.

Meanwhile, new movements have taken place in paper making industries. That is, recycling has become important and mixing ratio of waste paper has been increasing from a viewpoint of saving resources and preserving environments. Further, the ratio of the use of mechanical pulp, which can be produced in short process with a small amount of a chemical agent and suppressed generation of production wastewater as compared with chemical pulp, tends to be increased. The mechanical pulp, although its production cost is low, has a short pulp fiber and therefore, its retention rate on wires is inevitably decreased. Moreover, anionic substances extracted from raw material wood cannot be completely removed in relation to the technical aspect and cost performance and contaminate paper making raw materials. Accordingly, it is difficult to improve the retention rate by conventional retention process.

An object of the invention is to develop a polymer flocculant which can highly efficiently carry out dewatering treatment of sludges regardless of the seasonal fluctuation of the sludges; which can maintain a high retention rate even if the mixing ratio of waste paper and machine pulp is increased in the case of using the flocculent as a retention rate improver in paper making; and which has high flocculating capability and quick solubility as compared with a flocculent in powder state. For that, another object the invention is to develop a polymerization method for efficiently synthesizing an amphoteric polymer having cationic groups in a high concentration from an acrylate monomer containing a quaternary ammonium salt group and a methacrylate monomer containing a quaternary ammonium salt group with a high concentration. Further, another object of the invention is to provide various flocculation methods using the amphoteric polymer flocculent.

SUMMARY OF INVENTION

Based on the results of the enthusiastic investigations performed so as to solve the above-mentioned problems, the inventors of the invention have accomplished the following inventions.

That is, a first aspect of the invention provides an amphoteric water-soluble polymer dispersion containing polymer fine particles having particle diameters of 100 μm or less which is produced by dispersion polymerization of a monomer mixture containing the following monomers represented by the general formulas (1), (2), and (3), and (meth) acrylamide in mole % ratios a, b, c, and d, respectively, satisfying $50 \geq a \geq 5$; $50 \geq b \geq 5$; $40 \geq c \geq 5$; and $85 \geq d \geq 0$ in an aqueous salt solution in the presence of a polymer dispersant soluble in the aqueous salt solution:

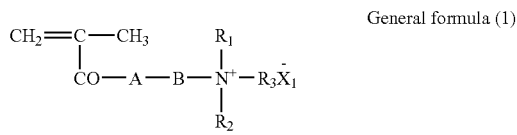

General formula (1)

(wherein, $R_1$ and $R_2$ independently denote alkyl or alkyloxy having 1 to 3 carbon atoms, or benzyl; $R_3$ denotes hydrogen, alkyl or alkyloxy having 1 to 3 carbon atoms, or benzyl; they may be similar or dissimilar; A denotes an oxygen atom or NH; B denotes alkylene or alkoxylene having 2 to 4 carbon atoms; and $X_1$ denotes an anion);

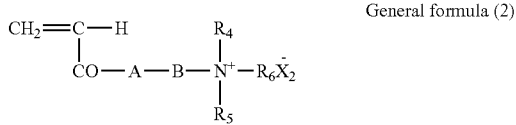

General formula (2)

(wherein, $R_4$ and $R_5$ independently denote alkyl or alkyloxy having 1 to 3 carbon atoms, or benzyl; $R_6$ denotes hydrogen, alkyl or alkyloxy having 1 to 3 carbon atoms, or benzyl; they may be similar or dissimilar; A denotes an oxygen atom or NH; B denotes alkylene or alkoxylene having 2 to 4 carbon atoms; and $X_2$ denotes an anion); and

General formula (3)

(wherein, $R_7$ denotes hydrogen, methyl, or carboxymethyl; $R_8$ denotes hydrogen or carboxy; Q denotes $SO_3$, $C_6H_4SO_3$, $CONHC(CH_3)_2CH_2SO_3$ or COO; and $Y_1$ denotes hydrogen or a cation).

A second aspect of the invention provides the amphoteric water-soluble polymer dispersion according to the first aspect, in which the mole % ratios a, b, and c of the monomers represented by the general formulas (1), (2) and (3), respectively, satisfy the following conditions: $30 \geq a \geq 5$; $50 \geq b \geq 10$; $30 \geq c \geq 5$; $0.9 \geq b/(a+b) \geq 0.5$; and $1.0 \geq c/(a+b) \geq 0.1$.

A third aspect of the invention provides the amphoteric water-soluble polymer dispersion according to the first aspect, in which the mole % ratios a, b, and c of the monomers represented by the general formulas (1), (2) and (3), respectively, satisfy the following conditions: $50 \geq a \geq 10$; $30 \geq b \geq 5$; $30 \geq c \geq 5$; $0.9 \geq a/(a+b) \geq 0.5$; and $1.0 \geq c/(a+b) \geq 0.1$.

A fourth aspect of the invention provides an amphoteric water-soluble polymer dispersion containing polymer fine particles having particle diameters of 100 μm or less which is produced by dispersion polymerization of a monomer mixture containing the monomers represented by the general formulas (1), (2), and (3), and (meth)acrylamide in mole % ratios a, b, c, and d, respectively, satisfying the following conditions: $30 \geq a \geq 10$; $20 \geq b \geq 5$; $50 \geq c \geq 20$; $65 \geq d \geq 0$; $0.90 > a/(a+b) \geq 0.5$; and $3.3 > c/(a+b) \geq 1.1$ in an aqueous salt solution in the presence of a polymer dispersant soluble in the aqueous salt solution.

A fifth aspect of the invention provides an amphoteric water-soluble polymer dispersion containing polymer fine particles having particle diameters of 100 μm or less which is produced by dispersion polymerization of a monomer mixture containing the monomers represented by the general formulas (1), (2), and (3), and (meth)acrylamide in mole % ratios a, b, c, and d, respectively, satisfying the following conditions: $20 \geq a \geq 5$; $30 \geq b \geq 10$; $50 \geq c \geq 20$; $65 \geq d \geq 0$; $0.90 \geq b/(a+b) \geq 0.5$; and $3.3 > c/(a+b) \geq 1.1$ in an aqueous salt solution in the presence of a polymer dispersant soluble in the aqueous salt solution.

A sixth aspect of the invention provides the amphoteric water-soluble polymer dispersion according to any one of the first to fifth aspects, which is produced by polymerization in the presence of a crosslinking monomer in a mole % ratio of 0.0001 to 0.01 in the total mole number of the monomer mixture.

A seventh aspect of the invention provides the amphoteric water-soluble polymer dispersion according to any one of the first to fifth aspects, in which the polymer dispersant is ionic.

An eighth aspect of the invention provides the amphoteric water-soluble polymer dispersion according to the seventh aspect, in which the ion equivalent of the polymer dispersant is 1.5 to 15 meq/g.

A ninth aspect of the invention provides the amphoteric water-soluble polymer dispersion according to any one of the first to fifth aspects, in which the amphoteric water-soluble polymer composing the amphoteric water-soluble dispersion has a molecular weight of 100,000 to 20,000,000.

A tenth aspect of the invention provides the amphoteric water-soluble polymer dispersion according to any one of the first to fifth aspects, in which the salt of the aqueous salt solution contains at least one kind of polyvalent anionic salt.

An eleventh aspect of the invention provides a method for dewatering organic sludge which comprises steps of: dissolving the amphoteric water-soluble polymer dispersion according to any one of the first to third aspects in water; then adding and mixing the resulting solution to and with organic sludge; and dewatering the sludge by a dewatering apparatus.

A twelfth aspect of the invention provides the method for dewatering organic sludge according to the eleventh aspect, in which an inorganic flocculant is used in combination.

A thirteenth aspect of the invention provides a method for dewatering organic sludge which comprises steps of: dissolving the amphoteric water-soluble polymer dispersion according to the first, fourth or fifth aspect in water; then adding and mixing the resulting solution to and with organic sludge in combination with an inorganic flocculant ; and dewatering the sludge by a dewatering apparatus.

A fourteenth aspect of the invention provides a method for pretreatment of a raw material for paper making which comprises steps of: dissolving the amphoteric water-soluble polymer dispersion according to any one of the first to third aspects in water; then treating the raw material by adding the resulting solution to the raw material before paper making; and carrying out paper making process.

A fifteenth aspect of the invention provides a paper making method which comprises steps of: dissolving the amphoteric water-soluble polymer dispersion according to any one of the first to third aspects in water; and adding the resulting solution to the raw material for paper making before paper making for the purpose of improving the retention rate and/or drainage properties.

A sixteenth aspect of the invention provides a paper making method which comprises steps of: dissolving the amphoteric water-soluble polymer dispersion according to any one of the first to third aspects in water for obtaining an aqueous solution; and adding the solution in combination of one or more (co)polymers of a monomer selected from (meth)acrylic acid and acrylamide 2-methylpropanesulfonic acid, or copolymer of acrylamide with the comonomer selected above to the raw material for paper making before paper making for the purpose of improving the retention rate and/or drainage properties.

DESCRIPTION OF THE PREFERRED EMBODIMENTS

Hereinafter, the invention will be described in details.

An amphoteric water-soluble polymer dispersion of the invention contains polymer fine particles with particle diameters of 100 μm or less produced by dispersion polymerization in an aqueous salt solution in the presence of an ionic polymer dispersant soluble in the aqueous salt solution. The water-soluble polymer comprising the polymer fine particle dispersion dispersed in the aqueous salt solution can be produced by a method disclosed in JP-A No. 62-15251 or the like. A practical production method can be described as follows. An aqueous solution of a polyvalent anionium salt such as ammonium sulfate is prepared and a methacrylate monomer containing a quaternary ammonium salt group and an acrylate monomer containing a quaternary ammonium salt group in specified ratios are added to the solution. Further, (meth)acrylic acid and acrylamide are added and as a dispersant, an ionic polymer such as an acryloxyethyltrimethylammonium compound polymer is made present before the polymerization. The pH at that time is set to be 2 to 6. After the mixture is dissolved evenly, oxygen in the reaction system is removed by replacement with nitrogen and a radical polymerization initiator is added to start the polymerization and thus the polymer can be produced. A chain transfer agent and crosslinking agent may be added before the start of the polymerization, similarly to other polymerization methods. If a polyhydric alcohol such as glycerin, polyethyleneglycol or the like exists, the precipitation state is further improved in some cases.

Examples of the methacrylate monomers containing quaternary ammonium salt groups defined by the general formula (1) include methacryloyloxyethyltrimethylammonium chloride, methacryloyloxyethyldiethylmethylammonium chloride, methacryloyloxyethyldimethylbenzylammonium chloride, and methacryloyloxyethyldiethylbenzylammonium chloride.

Examples of the acrylate monomers containing quaternary ammonium salt groups defined by the general formula (2) include acryloyloxyethyltrimethylammonium chloride, acryloyloxyethyldiethylmethylammonium chloride, acryloyloxyethyldimethylbenzylammonium chloride, and acryloyloxyethyldiethylbenzylammonium chloride.

Examples of the monomer defined by the general formula (3) include (meth)acrylic acid, itaconic acid, maleic acid, acrylamide 2-methylpropanesulfonic acid, and vinylbenzenesulfonic acid.

Next, the copolymerization ratios of these monomers will be described. That is, amphoteric water-soluble polymers of the invention can be divided into those of which the total mole number of the monomers containing quaternary ammonium salt groups is higher than that of anionic monomers and those of which the total mole number of the anionic monomers is higher than that of the monomers containing quaternary ammonium salt groups. Further, the polymers can be divided into those of which the total mole number of the methacrylate monomers containing quaternary ammonium salt groups is higher than that of the acrylate monomers containing quaternary ammonium salt groups and those of which the total mole number of the acrylate monomers containing quaternary ammonium salt groups is higher than that of the methacrylate monomers containing quaternary ammonium salt groups.

At first, the case of polymers of which the total mole number of the monomers containing quaternary ammonium salt groups is higher than that of anionic monomers will be described. In this case, the mole % ratios a, b, c, and d of the monomers represented by the general formulas (1), (2), and (3) and (meth)acrylamide, respectively, satisfy as follows: $50 \geq a \geq 5$; $50 \geq b \geq 5$; $40 \geq c \geq 5$; and $85 \geq d \geq 0$.

In this case, if $b \geq a$, it gives the case that the total mole number of the acrylate monomers containing quaternary ammonium salt groups is higher than that of the methacrylate monomers containing quaternary ammonium salt groups. The ratio of the cationic monomers and the anionic monomers preferably satisfies as follows. That is, if $b > a$, $30 \geq a \geq 5$; $50 \geq b \geq 10$; $30 \geq c \geq 5$ as well as $0.9 \geq b/(a+b) \geq 0.5$ and $1.0 \geq c/(a+b) \geq 0.1$. That means the mole % ratio of acrylate monomers containing quaternary ammonium salt groups is 50 mole % or more and 90 mole % or less and the mole % ratio of the anionic monomers in the total cationic monomers is 10 mole % or more and equivalent or less. In terms of polymerization reactivity, methacrylates are slightly inferior in the reactivity to acrylates and especially, in the case of synthesis of amphoteric polymers cross-linked in the presence of a crosslinking agent, methacrylates are disadvantageous and polymerization is promoted smoothly in the case of acrylates, so that the productivity and adjustment of the polymerization degree can be considerably advantageous. Accordingly, crosslinking reaction by copolymerization with a crosslinking monomer is easy to be caused and the crosslinking degree can be adjusted easily. In the case excess sludge of wastewater from food processing industries or the like is dewatered by a belt press, such crosslinked amphoteric polymers are suitable.

Meanwhile, if $a > b$, it is the case that the total mole number of the methacrylate monomers containing quaternary ammonium salt groups is higher than that of the acrylate monomers containing quaternary ammonium salt groups. That is, the mole % ratios satisfy as follows: $50 \geq a \geq 10$; $30 \geq b \geq 5$; $30 \geq c \geq 5$ as well as $0.9 \geq a/(a+b) \geq 0.5$ and $1.0 \geq c/(a+b) \geq 0.1$. That means the mole % ratio of methacrylate monomers containing quaternary ammonium salt groups is 50 mole % or more and 90 mole % or less and the mole % ratio of the anionic monomers in the total cationic monomers is 10 mole % or more and equivalent or less. As described above, methacrylates monomers having quaternary ammonium salt groups have slightly low reactivity as compared with acrylate monomers containing quaternary ammonium salt groups and make it difficult to obtain products with high polymerization degrees. However, the methacrylates have following advantages: they are resistant to hydrolysis since a methyl group is bonded to α-carbon; a branched structure is hardly formed since hydrogen is not bonded to α-carbon and consequently, polymers obtained by crosslinking hardly become insoluble; and they have proper hydrophobicity. Such polymers have an excellent dewatering effect on, for example, sewage digestion sludge or the like.

Next, the case of polymers of which the total mole number of the anionic monomers is higher than that of monomers containing quaternary ammonium salt groups will be described. That is, at first, in the case the polymerization ratio of the methacrylate monomers containing quaternary ammonium salt groups is high, the mole % ratios a, b, c, and d of the monomers represented by the general formulas (1), (2), and (3) and (meth)acrylamide, respectively, satisfy as follows: $30 \geq a \geq 10$; $20 \geq b \geq 5$; $50 \geq c \geq 20$; and $65 \geq d \geq 0$, and more preferably, $30 \geq a \geq 15$; $15 \geq b \geq 5$; $40 \geq c \geq 20$; and $60 \geq d \geq 15$. The ratio of the methacrylate monomers containing quaternary ammonium salt groups and the acrylate monomers containing quaternary ammonium salt groups or the ratio of the cationic monomers and the (meth)acrylic acids as anionic monomers satisfies as follows: $0.9>a/(a+b)\geqq0.5$ and $3.3>c/(a+b)\geqq1.1$.

As being understood from the above-mentioned inequalities, the amphoteric water-soluble polymers have a higher total mole number of the anionic monomers than that of the cationic monomers as well as a higher total mole number of the methacrylate monomers containing quaternary ammonium salt groups than that of the acrylate monomers containing quaternary ammonium salt groups. Such amphoteric water-soluble polymers are particularly effective if they are used in combination with inorganic flocculants for sludge dewatering. As described above, the methacrylate monomers containing quaternary ammonium salt groups have low reactivity as compared with the acrylate monomers containing quaternary ammonium salt groups and make it difficult to obtain products with high polymerization degrees, however they have proper hydrophobicity. Therefore, their aqueous solutions have low tackiness and in the case of dewatering sludge by adding polymer flocculants with a belt press for which the tackiness increase of the sludge is unfavorable, they give a good separation property from filter cloths.

As the fourth case, the case of amphoteric water-soluble polymers with a high copolymerization ratio of the acrylate monomers containing quaternary ammonium salt groups will be described. The mole % ratios a, b, c, and d of the monomers represented by the general formulas (1), (2), and (3) and (meth)acrylamide, respectively, satisfy as follows: $20\geqq a\geqq5$; $30\geqq b\geqq10$; $50\geqq c\geqq20$; and $65\geqq d\geqq0$. More preferably, $15\geqq a\geqq5$; $30\geqq b\geqq15$; $40\geqq c\geqq20$; and $60\geqq d\geqq15$. The ratio of the methacrylate monomers containing quaternary ammonium salt groups and the acrylate monomers containing quaternary ammonium salt groups or the ratio of the cationic monomers and the (meth)acrylic acids as anionic monomers satisfies as follows: $0.9>b/(a+b)\geqq0.5$ and $3.3>c/(a+b)\geqq1.1$.

The above-mentioned inequalities mean that the total mole number of the anionic monomers is higher than that of the cationic monomers as well as the total mole number of the acrylate monomers containing quaternary ammonium salt groups is higher than that of the methacrylate monomers containing quaternary ammonium salt groups. Such amphoteric water-soluble polymers are particularly effective if they are used in combination with inorganic flocculants for sludge dewatering, similarly as described above, and proper amphoteric water-soluble polymers may be used depending on the types of sludges and dewatering apparatus. That is, since the acrylate monomers containing quaternary ammonium salt groups have high reactivity as compared with the methacrylate monomers containing quaternary ammonium salt groups and make it easy to obtain products with high polymerization degrees. Especially, amphoteric water-soluble polymers crosslinked in the presence of crosslinking agents are effective for sewage sludges which are hardly dewatered.

The amphoteric water-soluble polymers of the invention are capable of improving the stickiness of dewatered cakes, if crosslinked polymers are synthesized by polymerization in the presence of a crosslinking agent. Examples of such a crosslinking agent are polyfunctional monomers such as N,N-methylenebis(acrylamide) and ethyleneglycol (meth)acrylate; and thermal crosslinking monomers such as N,N-dimethyl (meth)acrylamide and N,N-diethyl(meth)acrylamide.

The molecular weights of the amphoteric water-soluble polymers of the invention are in a range of 100,000 to 20,000,000, preferably 200,000 to 15,000,000. If they are 100,000 or lower, the polymers are insufficiently capable for various applications and if they are 20,000,000 or higher, the polymers have too high viscosity in form of solutions, resulting in dispersibility decrease and deterioration of the capabilities.

In the case of producing amphoteric water-soluble polymer dispersions of the invention, as polymer dispersants to be used, both ionic and nonionic dispersants are usable, and ionic ones are preferable. Among the ionic dispersants, cationic ones are preferable. Examples of the cationic dispersants are cationic monomers such as (meth)acryloyloxyethyltrimethylammonium chloride diemethyldiallylammonium chloride, and the like and copolymers of these cationic monomers with nonionic monomers may also be used. Examples of the nonionic monomers include acrylamide, N-vinylformamide, N-vinylacetamide, N-vinylpyrrolidone, N,N-dimethylacrylamide, acrylonitrile, diacetoneacrylamide, 2-hydroxyethyl (meth)acrylate and the like, and copolymers with acrylamide are preferable.

As the nonionic polymer dispersants, water-soluble polymers having amido groups and slight amounts of hydrophobic groups, for example, polyvinylpyrrolidone, acrylamide/vinylcaprolactam copolymer, acrylamide/styrene copolymer, and completely amidated maleic anhydride/butene copolymer are preferable.

The molecular weights of these cationic polymer dispersants are in a range of 5,000 to 2,000,000, preferably 50,000 to 1,000,000. The molecular weights of the nonionic polymer dispersants are in a range of 1,000 to 100,000, preferably 1,000 to 50,000. The addition amounts of these nonionic or ionic polymer dispersants to monomers are $\frac{1}{100}$ to $\frac{1}{10}$, preferably $\frac{2}{100}$ to $\frac{8}{100}$ to the monomers.

In general, the polymerization conditions in the case of producing the amphoteric water-soluble polymer dispersions are properly determined depending on the monomers to be used and their mole % ratios of the copolymerization and the temperature is in a range of 0 to 100° C. Radical polymerization initiators are used for starting the polymerization. Both oil-soluble and water-soluble initiators may be used and azo, peroxide, and redox type initiators are capable of starting polymerization. Examples of oil-soluble azo type initiators include 2,2'-azobis(isobutyronitrile), 1,1'-azobis(cyclohexanecarbonitrile), 2,2'-azobis(2-methylbutyronitrile), 2,2'-azobis(2-methylpropionate), and 4,4'-azobis[(4-methoxy-2,4-dimethyl)valeronitrile] and they are added while being dissolved in water-compatible solvents.

Examples of the water-soluble azo type initiators are 2,2'-azoebis(aminodipropane)di(hydrogen chloride), 2,2'-azoebis[2-(5-methyl-2-imidazolin-2-yl)propane]di(hydrogen chloride), 4,4'-azobis(4-cyanovaleric acid) and the like. Examples of the redox types are combinations of ammonium peroxodisulfate with sodium sulfite, sodium hydrogen sulfite, trimethylamine, tetramethylethylenediamine and the like. Examples of the peroxides are ammonium or potassium peroxodisulfate, hydrogen peroxide, benzoyl peroxide, lauroyl peroxide, octanoyl peroxide, succinic peroxide, tert-butylperoxy 2-ethylhexanoate and the like. Among them, 2,2'-azobis(aminodipropane)di(hydrogen chloride) and 2,2'-azoebis[2-(5-methyl-2-imidazolin-2-yl)propane]di(hydrogen chloride), which are water-soluble azo initiators, are most preferable.

The amphoteric water-soluble polymers of the invention are usable for dewatering of pulp sludge in paper making industries, also for various wastewater treatment methods in food processing industries, metal and petroleum refining, treatment for earth and sand washing wastewater relevant to construction materials, and mixed sludges including organic sludges and flocculated sludges generated in municipal or industrial wastewater treatment. They are particularly effective to digestion sludges of sewage and night soil, excess sludges of food processing wastewater, and the like as objects to be treated. These sludges are dewatered by producing aqueous solutions by dissolving the amphoteric water-soluble polymer dispersions of the invention in water, adding the aqueous solutions, flocculating the sludges, and carrying out dewatering by dewatering apparatus such as a belt press, a filter press, a decanter, or a screw press. The addition amount is changed depending on the wastewater type, the concentration of suspended solid or the like, however it is about 0.1 to 1,000 ppm in the liquid quantity. It is 0.1 to 3 wt. % to sludge SS in the case of sludges.

The amphoteric water-soluble polymers of the invention may be used as pretreatment agents for paper making raw materials. Recently, environment preservation has been big concern and resource-saving type production manners with suppressed effects on the environments have been investigated in many spheres. In consideration of environments, paper making industries have developed and investigated into machine pulp for which chemicals can be saved and also have tried to recycle waste paper. Although the machine pulp may be means for saving chemical agents, it contains a large quantity of chemical substances derived from raw material wood, therefore, if it is used as it is, the paper making is greatly affected by pitch troubles, deterioration of retention rate and/or drainage properties and the like. For that, cationic water-soluble polymers are highly expected as effective materials for the treatment of anionic substances and resin substances called as pitch existing in pulp and waste paper before paper making. The amphoteric water-soluble polymers of the invention are effective for the treatment for paper making raw materials in a wide pH range since they contain quaternary ammonium groups in the molecules. The addition amount is in a range of 0.005 to 0.5000 wt. %, preferably 0.01 to 0.1 wt. %, to dried paper making raw materials.

The amphoteric water-soluble polymers of the invention are also effective to improve the retention rate of pulp and fillers by using them alone or in combination with anionic water-soluble polymers with high molecular weights. Today, with respect to the paper making raw materials, as described above, the mixing ratios of the waste paper and machine pulp are increased and thus it becomes difficult to improve the retention rate at the time of paper making. Further, the paper making speed is increased and it inhibits the improvement of the retention rate. In order to deal with such situation, various two-component addition methods have been developed and the amphoteric water-soluble polymers of the invention are capable of improve the retention rate while being combined with water-soluble anionic polymers with high molecular weights. The addition order is preferable to add the amphoteric water-soluble polymers of the invention at first and then to add the water-soluble anionic polymers with high molecular weights. As the anionic water-soluble polymers, following can be used; (meth) acrylic acid polymers and copolymers of one or more anionic monomers selected from (meth)acrylic acid, itaconic acid, acrylamide 2-methylpropanesulfonic acid and the like with (meth)acrylamide. The anionic water-soluble polymers may be used in any state, such as in form of powders, aqueous solutions, emulsions and dispersion. The addition amount of the amphoteric water-soluble polymers in the case of using them alone is in a range of 0.005 to 0.5 wt. %, preferably 0.01 to 0.1 wt. %, to dried paper making raw materials. In the case of using them in combination with anionic water-soluble polymers, the addition amount is in a range of 0.002 to 0.1 wt. %, preferably 0.005 to 0.05 wt. %, to dried paper making raw materials.

BEST MODE FOR CARRYING OUT THE INVENTION

Hereinafter, the invention will be described with reference to Examples and Comparative examples, and it is not intended that the invention be limited to the illustrated embodiments. Various modifications and applications may occur to those skilled in the art without departing from the true spirit and scope of the invention as defined by the appended claims.

EXAMPLE 1

46.3 g of an aqueous solution containing 80 wt. % of methacryloyloxyethyltrimethylammonium chloride (hereinafter, abbreviated as DMC), 60.5 g of an aqueous solution containing 80 wt. % of acryloyloxyethyltrimethylammonium chloride (hereinafter, abbreviated as DMQ), 20.6 g of an aqueous solution containing 60 wt. % of acrylic acid (hereinafter, abbreviated as AAC), 36.5 g of an aqueous solution containing 50 wt. % of acrylamide (hereinafter, abbreviated as AAM), 173.1 g of ion-exchanged water, 125.0 g of ammonium sulfate, and 30.0 g of acryloyloxyethyltrimethylammonium chloride homopolymer (20 wt. % solution, viscosity 6,450 mPa·s) as a dispersant were respectively loaded to a four-mouth flask with 500 mL capacity provided with a thermometer, a stirrer, a nitrogen introduction pipe, monomer supply pipes connected to a peristapump (SMP-21 model; manufactured by Tokyo Rika Kiki Co., Ltd.) and a condenser and pH was adjusted to be 3.3. The mole % of the respective monomers was DMC/DMQ/AAC/AAM=25/35/20/20. Next, the reactor was kept at a temperature 30±2° C. and evacuated with nitrogen for 30 minutes, and then, 1.0 g of an aqueous solution containing 1 wt. % of 2,2'-azobis[2-(5-methyl-2-imidazolin-2-yl)propane]di(hydrogen chloride) (0.01 wt. % to the monomers) was added to start the polymerization. At the time when reaction was carried out for 7 hours from the starting of polymerization while the inside temperature being kept at 30±2° C., the foregoing initiator was added additionally in an amount of 0.01 wt. % to the monomers and after the reaction was carried out further for 7 hours, the reaction was finished. The concentration of the loaded monomers in the obtained dispersion was 20 wt. % and the polymer particle diameters were 10 μm or smaller and the viscosity of the dispersion was 750 mPa·s. The weight average molecular weight was measured by a molecular weight measurement apparatus (DLS-7000, manufactured by Otsuka Electronics Co., Ltd.) according to a static light-scattering method. The obtained dispersion was named as Sample 1. The composition is shown in Table 1 and the results are shown in Table 2.

EXAMPLE 2

A dispersion of an amphoteric water-soluble polymer comprising DMC/DMQ/AAC/AAM=10/40/10/30 (Sample-2) was obtained by polymerization in the same manner as in Example 1. The composition is shown in Table 1 and the results are shown in Table 2.

EXAMPLE 3

A dispersion of an amphoteric water-soluble polymer comprising DMC/DMQ/AAC/AAM=7.5/32.5/37.5/22.5. (Sample-3) was obtained by polymerization in the same manner as in Example 1, except the polymer dispersant was changed to polyvinylpyrrolidone (molecular weight; 10,000). The composition is shown in Table 1 and the results are shown in Table 2.

EXAMPLE 4

A dispersion of an amphoteric water-soluble polymer comprising DMC/DMQ/AAC/AAM=35/25/20/20 (Sample-4) was obtained by polymerization in the same manner as in Example 1. The composition is shown in Table 1 and the results are shown in Table 2.

EXAMPLE 5

A dispersion of an amphoteric water-soluble polymer comprising DMC/DMQ/AAC/AAM=40/10/10/30 (Sample-5) was obtained by polymerization in the same manner as in Example 1. The composition is shown in Table 1 and the results are shown in Table 2.

EXAMPLE 6

A dispersion of an amphoteric water-soluble polymer comprising DMC/DMQ/AAC/AAM=32.5/7.5/37.5/22.5 (Sample-6) was obtained by polymerization in the same manner as in Example 1, except the polymer dispersant was changed to polyvinylpyrrolidone (molecular weight; 10,000). The composition is shown in Table 1 and the results are shown in Table 2.

EXAMPLE 7

46.3 g of an aqueous solution containing 80 wt. % of methacryloyloxyethyltrimethylammonium chloride (hereinafter, abbreviated as DMC), 60.5 g of an aqueous solution containing 80 wt. % of acryloyloxyethyltrimethylammonium chloride (hereinafter, abbreviated as DMQ), 20.6 g of an aqueous solution containing 60 wt. % of acrylic acid (hereinafter, abbreviated as AAC), 36.5 g of an aqueous solution containing 50 wt. % of acrylamide (hereinafter, abbreviated as AAM), 173.1 g of ion-exchanged water, 125.0 g of ammonium sulfate, 30.0 g of acryloyloxyethyltrimethylammonium chloride homopolymer (20 wt. % solution, viscosity 6,450 mPa·s), and 0.5 g of an aqueous solution containing 0.1 wt. % of N,N-methylenebis(acrylamide) (0.0004 mole % to monomers) were respectively loaded to a four-mouth flask with 500 mL capacity provided with a thermometer, a stirrer, a nitrogen introduction pipe, monomer supply pipes connected to a perista-pump (SMP-21 model; manufactured by Tokyo Rika Kiki Co., Ltd.) and a condenser and pH was adjusted to be 3.4. The mole % of the respective monomers was DMC/DMQ/AAC/AAM=25/35/20/20. Next, the reactor was kept at a temperature 30±2° C. and evacuated with nitrogen for 30 minutes, and then, 1.0 g of an aqueous solution containing 1 wt. % of 2,2'-azobis[2-(5-methyl-2-imidazolin-2-yl)propane]di(hydrogen chloride) (0.01 wt. % to the monomers) was added to start the polymerization. At the time when reaction was carried out for 7 hours from the starting of polymerization while the inside temperature being kept at 30±2° C., the foregoing initiator was added additionally in an amount of 0.01 wt. % to the monomers and after the reaction was carried out further for 7 hours, the reaction was finished. The concentration of the loaded monomers in the obtained dispersion was 20 wt. % and the polymer particle diameters were 10 μm or smaller and the viscosity of the dispersion was 680 mPa·s. The weight average molecular weight was measured by a molecular weight measurement apparatus (DLS-7000, manufactured by Otsuka Electronics Co., Ltd.) according to a static light-scattering method. The obtained dispersion was named as Sample-7. The composition is shown in Table 1 and the results are shown in Table 2.

EXAMPLE 8

A dispersion of an amphoteric water-soluble polymer comprising DMC/DMQ/AAC/AAM=10/40/10/30, and N,N-methylenebis(acrylamide) 0.0005 mole % to the monomers (Sample-8) was obtained by polymerization in the same manner as in Example 7. The composition is shown in Table 1 and the results are shown in Table 2.

EXAMPLE 9

A dispersion of an amphoteric water-soluble polymer comprising DMC/DMQ/AAC/AAM=7.5/32.5/37.5/22.5, and N,N-methylenebis(acrylamide) 0.0006 mole % to the monomers (Sample-9) was obtained by polymerization in the same manner as in Example 7, except the polymer dispersant was changed to methacryloyloxyethyltrimethylammonium chloride homopolymer (20 wt. % solution, viscosity 8,200 mPa·s). The composition is shown in Table 1 and the results are shown in Table 2.

EXAMPLE 10

A dispersion of an amphoteric water-soluble polymer comprising DMC/DMQ/AAC/AAM=35/25/20/20, and N,N-methylenebis(acrylamide) 0.0004 mole % to the monomers (Sample-10) was obtained by polymerization in the same manner as in Example 7, except the polymer dispersant was changed to a completely amidated maleic anhydride/butene copolymer (molecular weight 10,000). The composition is shown in Table 1 and the results are shown in Table 2.

EXAMPLE 11

A dispersion of an amphoteric water-soluble polymer comprising DMC/DMQ/AAC/AAM=40/10/10/30 (Sample-11) was obtained by polymerization in the same manner as in Example 7. The composition is shown in Table 1 and the results are shown in Table 2.

EXAMPLE 12

A dispersion of an amphoteric water-soluble polymer comprising DMC/DMQ/AAC/AAM=32.5/7.5/37.5/22.5 (Sample-12) was obtained by polymerization in the same manner as in Example 7, except the polymer dispersant was changed to a completely amidated maleic anhydride/butene copolymer (molecular weight 10,000). The composition is shown in Table 1 and the results are shown in Table 2.

COMPARATIVE EXAMPLES 1 TO 5

Dispersions of amphoteric water-soluble polymers comprising DMC/DMQ/AAC/AAM=10/40/3/47 (Comparison-1), DMC/DMQ/AAC/AAM=10/30/40/20 (Comparison-2), DMC/DMQ/AAC/AAM=40/10/3/47 (Comparison-3), DMC/DMQ/AAC/AAM=30/10/40/20 (Comparison-4), and DMC/DMQ/AAC/AAM=10/40/3/47 (crosslinking agent 0.0004 mole % to monomers) (Comparison-5), were obtained by polymerization in the same manner as in Example 1. The compositions are shown in Table 1 and the results are shown in Table 2.

EXAMPLE 13

42.0 g of an aqueous solution containing 60 wt. % of acrylic acid (hereinafter, abbreviated as AAC) and 190.1 g of ion-exchanged water were loaded to a four-mouth flask with 500 mL capacity provided with a thermometer, a stirrer, a nitrogen introduction pipe, monomer supply pipes connected to a perista-pump (SMP-21 model; manufactured by Tokyo Rika Kiki Co., Ltd.) and a condenser and acrylic acid 50 mole % was neutralized by adding 23.3 g of an aqueous solution containing 30 wt. % of sodium hydroxide. Thereafter, 22.3 g of an aqueous solution containing 80 wt. % of methacryloyloxyethyltrimethylammonium chloride (hereinafter, abbreviated as DMC), 83.0 g of an aqueous solution containing 80 wt. % of acryloyloxyethyltrimethylammonium chloride (hereinafter, abbreviated as DMQ), 36.5 g of an aqueous solution containing 50 wt. % of acrylamide (hereinafter, abbreviated as AAM), 125.0 g of ammonium sulfate, and 30.0 g of acryloyloxyethyltrimethylammonium chloride homopolymer (20 wt. % solution, viscosity 6,450 mPa·s) as a dispersant were respectively loaded to the flask. At that time, pH was 3.7. The mole % of the respective monomers was DMC/DMQ/AAC/AAM=25/10/40/20. Next, the reactor was kept at a temperature 30±2° C. and evacuated with nitrogen for 30 minutes, and then, 1.0 g of an aqueous solution containing 1 wt. % of 2,2'-azobis[2-(5-methyl-2-imidazolin-2-yl)propane]di(hydrogen chloride) (0.015 wt. % to the monomers) was added to start the polymerization. At the time when reaction was carried out for 7 hours from the starting of polymerization while the inside temperature being kept at 30±2° C., the foregoing initiator was added additionally in an amount of 0.01 wt. % to the monomers and after the reaction was carried out further for 7 hours, the reaction was finished. The concentration of the loaded monomers in the obtained dispersion was 20 wt. % and the polymer particle diameters were 10 μm or smaller and the viscosity of the dispersion was 960 mPa·s. The weight average molecular weight was measured by a molecular weight measurement apparatus (DLS-7000, manufactured by Otsuka Electronics Co., Ltd.) according to a static light-scattering method. The obtained dispersion was named as Sample-13. The composition is shown in Table 3 and the results are shown in Table 4.

EXAMPLES 14 TO 17

Dispersions with compositions of DMC/DMQ/AAC/AAM=15/10/44/31 (Sample-14), DMC/DMQ/AAC/AAM=25/5/35/35 (Sample-15), DMC/DMQ/AAC/AAM=10/5/38/47 (Sample-16), and DMC/DMQ/AAC/AAM=15/5/40/40 (Sample-14) were synthesized in the same manner as in Example 13. The compositions are shown in Table 3 and the results are shown in Table 4.

EXAMPLE 18

42.0 g of an aqueous solution containing 60 wt. % of acrylic acid (hereinafter, abbreviated as AAC) and 190.1 g of ion-exchanged water were loaded to a four-mouth flask with 500 mL capacity provided with a thermometer, a stirrer, a nitrogen introduction pipe, monomer supply pipes connected to a perista-pump (SMP-21 model; manufactured by Tokyo Rika Kiki Co., Ltd.) and a condenser and acrylic acid 50 mole % was neutralized by adding 23.1 g of an aqueous solution containing 30 wt. % of sodium hydroxide. Thereafter, 22.5 g of an aqueous solution containing 80 wt. % of methacryloyloxyethyltrimethylammonium chloride (hereinafter, abbreviated as DMC), 52.3 g of an aqueous solution containing 80 wt. % of acryloyloxyethyltrimethylammonium chloride (hereinafter, abbreviated as DMQ), 30.8 g of an aqueous solution containing 50 wt. % of acrylamide (hereinafter, abbreviated as AAM), 125.0 g of ammonium sulfate, and 30.0 g of acryloyloxyethyltrimethylammonium chloride homopolymer (20 wt. % solution, viscosity 6,450 mPa·s) as a dispersant were respectively loaded to the flask. At that time, pH was 3.8. The mole % of the respective monomers was DMC/DMQ/AAC/AAM=10/25/40/25. Next, the reactor was kept at a temperature 30±2° C. and evacuated with nitrogen for 30 minutes, and then, 1.0 g of an aqueous solution containing 1 wt. % of 2,2'-azobis[2-(5-methyl-2-imidazolin-2-yl)propane]di(hydrogen chloride) (0.015 wt. % to the monomers) was added to start the polymerization. At the time when reaction was carried out for 7 hours from the starting of polymerization while the inside temperature being kept at 30±2° C., the foregoing initiator was added additionally in an amount of 0.01 wt. % to the monomers and after the reaction was carried out further for 7 hours, the reaction was finished. The concentration of the loaded monomers in the obtained dispersion was 20 wt. % and the polymer particle diameters were 10 μm or smaller and the viscosity of the dispersion was 820 mPa·s. The weight average molecular weight was measured by a molecular weight measurement apparatus (DLS-7000, manufactured by Otsuka Electronics Co., Ltd.) according to a static light-scattering method. The obtained dispersion was named as Sample-18. The composition is shown in Table 3 and the results are shown in Table 4.

EXAMPLES 19 TO 22

Dispersions with compositions of DMC/DMQ/AAC/AAM=Oct. 25, 1944/31 (Sample-19), DMC/DMQ/AAC/AAM=5/20/29/46 (Sample-20), DMC/DMQ/AAC/AAM =5/10/38/47 (Sample-21), and DMC/DMQ/AAC/AAM=7/15/40/38 (Sample-22) were synthesized in the same manner as in Example 1. The compositions are shown in Table 3 and the results are shown in Table 4.

COMPARATIVE EXAMPLE 6

127.6 g of ion-exchanged water and 46.1 g of an aqueous solution containing 60 wt. % of acrylic acid (AAC) were loaded and 46.0 g of an aqueous solution containing 30 wt. % of sodium hydroxide (90 mole % to the acrylic acid) was added to neutralize the acrylic acid solution. 54.6 g of an aqueous solution containing 50 wt. % of acrylamide (AAM), 31.0 g of an aqueous solution containing 80 wt. % of acryloyloxyethyltrimethylammonium chloride (hereinafter, abbreviated as DMQ), 99.7 g of an aqueous solution containing 80 wt. % of methacryloyloxyethyltrimethylammonium chloride (hereinafter, abbreviated as DMC), and 0.35 g of isopropyl alcohol were loaded additionally to the obtained mixture and respectively completely dissolved. Separately, 15.0 g of sorbitan monooleate was dissolved in 126.0 g of isoparaffin with a boiling point of 190° C. to 230° C. and the foregoing monomer solution was mixed and emulsified at 3,000 rpm for 10 minutes by a homogenizer. The obtained emulsion was loaded to a reaction tank equipped with a stirrer and a temperature control apparatus and the reaction tank was kept at an inner temperature of 33 to 35° C. and evacuated with nitrogen for 30 minutes. Thereafter, 1.8 g of a dioxan solution containing 5 wt. % of 4,4-azobis(4-methoxy-2,4-dimethyl)valeronitrile (0.05 mole % to the monomers) was added to start the polymerization.

After 5 hours from the starting, 0.9 g of the foregoing initiator solution was additionally added to continue the polymerization further for 5 hours. An amphoteric water-soluble polymer comprising DMC/DMQ/AAC/AAM=30/10/30/30 was synthesized by a water-in-oil type emulsion polymerization method. The composition was shown in Table 3 and the results are shown in Table 4.

COMPARATIVE EXAMPLES 7 TO 11

Amphoteric water-soluble polymers with compositions of DMC/DMQ/AAC/AAM=20/0/80/0 (mole %) (Compasion-7), DMC/DMQ/AAC/AAM=20/30/20/30 (mole %) (Compasion-8), DMC/DMQ/AAC/AAM=10/30/30/30 (mole %) (Compasion-9), DMC/DMQ/AAC/AAM=0/20/80/0 (mole %) (Compasion-10), and DMC/DMQ/AAC/AAM=15/15/30/40 (mole %) (Compasion-11) were synthesized by the water-in-oil type emulsion polymerization method in the same manner as Comparative Example 6. The compositions are shown in Table 3 and the results are shown in Table 4.

EXAMPLES 23 TO 37

200 mL of food processing wastewater excess sludge (pH 6.65, total SS 24,000 mg/mL) was sampled in a poly-beaker and mixed with each of the amphoteric water-soluble polymers of the invention shown in Table 2; Sample-1 to Sample-3 and Sample-7 to Sample-9, in a concentration of 3000 ppm on the basis of sludge solid matter and subjected to stirring by transferring to beakers 10 times and then the sludge was filtered by a filter cloth T-1179L (made of nylon) and the amount of the filtrate after 45 seconds was measured. The filtered sludge was dewatered by press pressure of 2 Kg/m$^2$ for 1 minute. Thereafter, the separation property from the filter cloth and the cake self-retention property (related to the hardness and the water content of the dewatered cake) were investigated by eye observation and the water content of the cake (dried at 105° C. for 2 hrs) was measured. Next, tests were carried out in the case of using inorganic flocculant in combination. Similarly 200 mL of sludge was sampled, mixed with polyferric chloride in a concentration of 1,600 ppm on the basis of the sludge solid matter and stirred by transferring to beakers 5 times. Then, each of the amphoteric water-soluble polymers of the invention shown in Table 2; Sample-1 to Sample-12 in a concentration of 3,500 ppm on the basis of sludge solid matter was added to the sludge and the sludge was subjected to stirring by transferring to beakers 10 times and then the sludge was subjected to the similar measurement tests. The results are shown in Table 5.

COMPARATIVE EXAMPLES 12 TO 21

Using the amphoteric water-soluble polymers Comparison-1 to Comparision-5 of Comparative examples in Table 2 or Table 4, tests were carried out in the same manner as in Examples 23 to 37. The results are shown in Table 5.

EXAMPLES 38 TO 47

200 mL of sewage digestion (pH 7.40, total SS 32,000 mg/L) sludge was sampled in a poly-beaker, mixed with polyferric chloride in a concentration of 3,500 ppm on the basis of the sludge solid matter and stirred by transferring to beakers 5 times. The pH of sludge after stirred was 6.2. Thereafter, each of the amphoteric water-soluble polymers of the invention shown in Table 4; Sample-13 to Sample-22 in a concentration of 2,000 ppm on the basis of sludge solid matter was added to the sludge and the sludge was stirred by transferring to beakers 10 times and then, the sludge was filtered by a filter cloth T-1179L (made of nylon) and the amount of the filtrate after 45 seconds was measured. The filtered sludge was dewatered by press pressure of 2 Kg/m$^2$ for 1 minute. Then, the separation property from the filter cloth and the cake self-retention property (related to the hardness and the water content of the dewatered cake) were investigated by eye observation and the water content of the cake (dried at 105° C. for 2 hrs) was measured. The results are shown in Table 6.

COMPARATIVE EXAMPLES 22 TO 27

Using the amphoteric water-soluble polymers Comparison-6 to Comparision-11 of Comparative examples in Table 4, tests were carried out in the same manner as in Examples 38 to 47. The results are shown in Table 6.

EXAMPLES 48 TO 53

By the same process as that of Examples 1 to 6, Sample-23 to Sample 28 shown in Table 7 were synthesized. Using these samples, tests of pretreatment of paper making raw materials were carried out. Thermo-mechanical pulp, magazine waste paper, wood-containing paper raw material containing LBKP (pH 6.85; turbidity 950 FAU; the total SS 3.50 wt. %; ash content 0.11 wt. %; cation demand 0.67 meg/L; zeta potential-13 mV) were sampled respectively in 100 mL, set in a stirring apparatus, mixed with each of Sample-23 to Sample-28 shown in Table 8 in each 300 ppm on the basis of SS, and stirred at 200 rpm for 60 seconds. Thereafter, the entire amount of the sludge was filtered by filter paper NO. 41 (90 nm) manufactured by Wattman and the cation demand of the filtrate was measured by PCB-03 model manufactured by Mutec and the turbidity was measured by HACH, DE 2000 P model turbidometer. The results are shown in Table 8.

COMPARATIVE EXAMPLES 28 AND 29

As comparative polymers, using a condensate type polymer cation; a dimethylamine/epichlorohydrin/polyamine reaction product (molecular weight 16,500; cation equivalent 7.31 meq/g; Comparison-A); and a comparative polymer; a dimethylaminoethyl methacrylate homopolymer neutralized by hydrochloric acid (molecular weight 650,000; cation equivalent 5.12 meq/g; Comparison-B), the tests were carried out in the same manner as in the above-mentioned Examples. The results are shown in Table 8.

EXAMPLES 54 TO 59

A paper making raw material (for making wood-free paper; mainly containing LBKP; pH 6.23; total SS 2.37 wt. %; ash content 0.41 wt. %) as a sample was diluted with tap water to adjust the pulp concentration to be 0.9 wt. % and the retention rate was measured by a Britt-type dynamic jar tester. As additive chemical agents, 0.2 wt. % of cationic starch on the basis of the paper making raw material (the same below), 20 wt. % of light calcium carbonate, 0.2 wt. % of neutral rosin sizing agent, 0.6 wt. % of sulfate alum, and 0.025 wt. % of each of amphoteric water-soluble polymers Sample-1 to Sample-6 were added in this order at 15 second intervals and stirred. The pH was 6.57 after the entire chemical agents were added. After dried, the filter paper was incinerated at 600° C. and the remaining ash was measured to calculate the calcium carbonate retention rate. The results are shown in Table 9.

COMPARATIVE EXAMPLES 30 TO 33

Using Comparison-1 to Comparision-4, tests were carried out in the same process as Example 54 to 59. The results are shown in Table 9.

EXAMPLES 60 TO 65

A paper making raw material (for making wood-free paper; mainly containing LBKP; pH 6.23; total SS 2.37 wt. %; ash content 0.41 wt. %) as a sample was diluted with tap water to adjust the pulp concentration to be 0.9 wt. % and the retention rate was measured by a Britt-type dynamic jar tester. As additive chemical agents, 0.2 wt. % of cationic starch on the basis of the paper making raw material (the same below), 20 wt. % of light calcium carbonate, 0.2 wt. % of neutral rosin sizing agent, 0.6 wt. % of sulfate alum, and 0.015 wt. % of each of amphoteric water-soluble polymers Sample-1 to Sample-6 were added in this order at 15 second intervals and finally, 0.01 wt. % of an aqueous solution containing 0.2 wt. % of an anionic flocculent (Himoloc SS-120; anionization degree 20 mole %; molecular weight 1,200) was added and stirred. The pH was 6.57 after the entire chemical agents were added. After dried, the filter paper was incinerated at 600° C. and the remaining ash was measured to calculate the calcium carbonate retention rate. The results are shown in Table 10.

COMPARATIVE EXAMPLES 34 TO 37

Using Comparison-1 to Comparision-4, tests were carried out in the same process as in Examples 60 to 65. The results are shown in Table 10.

INDUSTRIAL APPLICABILITY

An amphoteric water-soluble polymer dispersion product containing polymer particles with particle diameters of 100 μm or smaller in which a cationic group-containing amphoteric water-soluble polymer obtained by dispersion-polymerization of a monomer mixture containing a methacrylate monomer containing a quaternary ammonium salt group, an acrylate monomer containing a quaternary ammonium salt group, (meth)acrylic acid, and acrylamide in the respectively specified ranges of mole % in an aqueous salt solution in the presence of a polymer dispersant soluble in the aqueous salt solution can be dispersed in a short time can efficiently be produced with a high concentration. The amphoteric water-soluble polymer dispersion product can be used as a dewatering agent for organic sludges, a pretreatment agent or a retention rate-enhancing agent for paper making raw materials and accordingly, the product is remarkably applicable and valuable in industrial fields.

TABLE 1

|  | DMC | DMQ | AAC | AAM | b/(a + b) | a/(a + b) | c/(a + b) |
|---|---|---|---|---|---|---|---|
| Example | | | | | | | |
| 1 | 25 | 35 | 20 | 20 | 0.58 | — | 0.33 |
| 2 | 10 | 40 | 10 | 30 | 0.81 | — | 0.17 |
| 3 | 7.5 | 32.5 | 37.5 | 22.5 | 0.81 | — | 0.94 |
| 4 | 35 | 25 | 20 | 20 | — | 0.58 | 0.33 |
| 5 | 40 | 10 | 10 | 30 | — | 0.81 | 0.17 |
| 6 | 32.5 | 7.5 | 37.5 | 22.5 | — | 0.81 | 0.94 |
| 7 | 25 | 35 | 20 | 20 | 0.58 | — | 0.33 |
| 8 | 10 | 40 | 10 | 30 | 0.81 | — | 0.17 |
| 9 | 7.5 | 32.5 | 37.5 | 22.5 | 0.81 | — | 0.94 |
| 10 | 35 | 25 | 20 | 20 | — | 0.58 | 0.33 |
| 11 | 40 | 10 | 10 | 30 | — | 0.81 | 0.17 |
| 12 | 32.5 | 7.5 | 37.5 | 22.5 | — | 0.81 | 0.94 |
| Comparative Example | | | | | | | |
| 1 | 10 | 40 | 3 | 47 | — | — | 0.06 |
| 2 | 10 | 30 | 40 | 20 | — | — | 1.0 |
| 3 | 40 | 10 | 3 | 47 | — | — | 0.06 |
| 4 | 30 | 10 | 40 | 20 | — | — | 1.0 |
| 5 | 10 | 40 | 3 | 47 | — | — | 0.06 |

DMC; methacryloyloxyethyltrimethylammonium chloride
DMQ; acryloyloxyethyltrimethylammonium chloride
AAC; acrylic acid, and
AAM; acrylamide
Examples 1 to 6; no N,N-methylenebis(acrylamide) was added
Examples 7 to 12; N,N-methylenebis(acrylamide) was added at the time of polymerization

TABLE 2

|  | Sample name | Crosslinking agent | Dispersion viscosity | Molecular weight |
|---|---|---|---|---|
| Example | | | | |
| 1 | Sample-1 | — | 750 | 650 |
| 2 | Sample-2 | — | 880 | 850 |
| 3 | Sample-3 | — | 910 | 800 |
| 4 | Sample-4 | — | 520 | 580 |
| 5 | Sample-5 | — | 770 | 510 |
| 6 | Sample-6 | — | 500 | 550 |
| 7 | Sample-7 | 0.0004 | 690 | 670 |
| 8 | Sample-8 | 0.0004 | 760 | 920 |
| 9 | Sample-9 | 0.0005 | 600 | 810 |
| 10 | Sample-10 | 0.0006 | 1120 | 600 |
| 11 | Sample-11 | 0.0004 | 1170 | 520 |
| 12 | Sample-12 | 0.0004 | 1150 | 500 |
| Comparative Example | | | | |
| 1 | Comparison-1 | — | 620 | 760 |
| 2 | Comparison-2 | — | 1070 | 590 |
| 3 | Comparison-3 | — | 885 | 620 |
| 4 | Comparison-4 | — | 1100 | 500 |
| 5 | Comparison-5 | 0.0004 | 670 | 815 |

Crosslinking agent; on the basis of monomers, mole %, viscosity mPa · s
Molecular weight; unit of 10,000

TABLE 3

|  | DMC | DMQ | AAC | AAM | b/(a + b) | a/(a + b) | c/(a + b) |
|---|---|---|---|---|---|---|---|
| Example | | | | | | | |
| 13 | 25 | 10 | 40 | 25 | 0.71 | — | 1.14 |
| 14 | 15 | 10 | 44 | 31 | 0.60 | — | 1.75 |
| 15 | 25 | 5 | 35 | 35 | 0.83 | — | 1.17 |
| 16 | 10 | 5 | 38 | 47 | 0.67 | — | 2.50 |
| 17 | 15 | 5 | 40 | 40 | 0.75 | — | 2.00 |
| 18 | 10 | 25 | 40 | 25 | — | 0.71 | 1.14 |
| 19 | 10 | 15 | 44 | 31 | — | 0.60 | 1.75 |
| 20 | 5 | 20 | 29 | 46 | — | 0.80 | 1.17 |
| 21 | 5 | 10 | 38 | 47 | — | 0.67 | 2.50 |
| 22 | 7 | 15 | 40 | 38 | — | 0.68 | 1.82 |

TABLE 3-continued

|  | DMC | DMQ | AAC | AAM | b/(a + b) | a/(a + b) | c/(a + b) |
|---|---|---|---|---|---|---|---|
| Comparative Example |  |  |  |  |  |  |  |
| 6 | 30 | 10 | 30 | 30 | 0.75 | — | 0.75 |
| 7 | 20 | 0 | 80 | 0 | 0.67 | — | 4.00 |
| 8 | 20 | 30 | 20 | 30 | 0.40 | — | 0.40 |
| 9 | 10 | 30 | 30 | 30 | — | 0.75 | 0.75 |
| 10 | 0 | 20 | 80 | 0 | — | 0.33 | 4.00 |
| 11 | 15 | 15 | 30 | 40 | — | 0.50 | 1.00 |

DMC; methacryloyloxyethyltrimethylammonium chloride
DMQ; acryloyloxyethyltrimethylammonium chloride
AAC; acrylic acid, and
AAM; acrylamide
Examples 1 to 6; no N,N-methylenebis(acrylamide) was added
Examples 7 to 12; N,N-methylenebis(acrylamide) was added at the time of polymerization

TABLE 4

|  | Sample name | Dispersion viscosity | Molecular weight |
|---|---|---|---|
| Example |  |  |  |
| 13 | Sample-13 | 750 | 650 |
| 14 | Sample-14 | 880 | 850 |
| 15 | Sample-15 | 610 | 800 |
| 16 | Sample-16 | 920 | 580 |
| 17 | Sample-17 | 970 | 510 |
| 18 | Sample-18 | 1100 | 550 |
| 19 | Sample-19 | 690 | 670 |
| 20 | Sample-20 | 760 | 920 |
| 21 | Sample-21 | 600 | 810 |
| 22 | Sample-22 | 1120 | 600 |
| Comparative Example |  |  |  |
| 6 | Comparison-6 | 350 | 485 |
| 7 | Comparison-7 | 180 | 570 |
| 8 | Comparison-8 | 500 | 610 |
| 9 | Comparison-9 | 610 | 860 |
| 10 | Comparison-10 | 200 | 610 |
| 11 | Comparison-11 | 470 | 540 |

Crosslinking agent; on the basis of monomers, mole %, viscosity mPa·s
Molecular weight; unit of 10,000

TABLE 5

|  | Sample name | Inorganic flocculant | Filtrate amount after 45 seconds | Separation property from filter cloth | Water content in cake |
|---|---|---|---|---|---|
| Example |  |  |  |  |  |
| 23 | Sample-1 | No addn. | 168 | ○ | 74.4 |
| 24 | Sample-2 | No addn. | 158 | ○ | 74.g |
| 25 | Sample-3 | No addn. | 150 | ○ | 76.1 |
| 26 | Sample-7 | No addn. | 170 | ○ | 73.9 |
| 27 | Sample-8 | No addn. | 165 | ○ | 74.1 |
| 28 | Sample-9 | No addn. | 156 | ○ | 75.7 |
| 29 | Sample-1 | 1600 | 174 | ○ | 72.3 |
| 30 | Sample-2 | 1600 | 175 | ○ | 72.5 |
| 31 | Sample-3 | 1600 | 166 | ○ | 73.2 |
| 35 | Sample-7 | 1600 | 175 | ○ | 72.2 |
| 36 | Sample-8 | 1600 | 175 | ○ | 73.7 |
| 37 | Sample-9 | 1600 | 170 | ○ | 73.7 |
| Comparative Example |  |  |  |  |  |
| 12 | Comparison-1 | No addn. | 135 | Δ | 77.0 |
| 13 | Comparison-2 | No addn. | 130 | Δ | 77.5 |
| 14 | Comparison-3 | No addn. | 125 | x | 78.5 |
| 15 | Comparison-4 | No addn. | 115 | x | 78.8 |
| 16 | Comparison-5 | No addn. | 125 | Δ | 77.3 |
| 17 | Comparison-1 | 1600 | 140 | Δ | 76.2 |
| 18 | Comparison-2 | 1600 | 132 | Δ | 76.7 |
| 19 | Comparison-3 | 1600 | 135 | x | 76.1 |
| 20 | Comparison-4 | 1600 | 138 | x | 76.1 |
| 21 | Comparison-5 | 1600 | 135 | x | 76.5 |

Inorganic flocculant addition amount: ppm (on the basis of sludge solid matter)
Filtrate amount: mL, water content of cake: wt. %

TABLE 6

|  | Sample name | Inorganic flocculant | Filtrate amount after 45 seconds | Separation property from filter cloth | Water content in cake |
|---|---|---|---|---|---|
| Example |  |  |  |  |  |
| 38 | Sample-13 | 3500 | 161 | ○ | 67.3 |
| 39 | Sample-14 | 3500 | 165 | ○ | 67.0 |
| 40 | Sample-15 | 3500 | 171 | ○ | 66.8 |
| 41 | Sample-16 | 3500 | 155 | ○ | 67.9 |
| 42 | Sample-17 | 3500 | 150 | ○ | 67.4 |
| 43 | Sample-18 | 3500 | 150 | ○ | 68.3 |
| 44 | Sample-19 | 3500 | 156 | ○ | 68.0 |
| 45 | Sample-20 | 3500 | 150 | ○ | 68.6 |
| 46 | Sample-21 | 3500 | 160 | ○ | 67.6 |
| 47 | Sample-22 | 3500 | 154 | ○ | 67.7 |
| Comparative Example |  |  |  |  |  |
| 22 | Comparison-6 | 3500 | 150 | ○ | 69.7 |
| 23 | Comparison-7 | 3500 | 135 | Δ | 71.5 |
| 24 | Comparison-8 | 3500 | 156 | ○ | 69.5 |
| 25 | Comparison-9 | 3500 | 152 | ○ | 70.8 |
| 26 | Comparison-10 | 3500 | 130 | Δ | 71.g |
| 27 | Comparison-11 | 3500 | 140 | ○ | 70.3 |

Inorganic flocculant addition amount: ppm (on the basis of sludge solid matter)
Filtrate amount: mL, water content of cake: wt. %

TABLE 7

| Sample name | DMC | DMQ | AAC | AAM | Molecular weight |
|---|---|---|---|---|---|
| Sample-23 | 25 | 35 | 20 | 20 | 600,000 |
| Sample-24 | 10 | 40 | 10 | 30 | 750,000 |
| Sample-25 | 7.5 | 32.5 | 37.5 | 22.5 | 450,000 |
| Sample-26 | 35 | 25 | 20 | 20 | 500,000 |
| Sample-27 | 40 | 10 | 10 | 30 | 350,000 |
| Sample-28 | 32.5 | 7.5 | 37.5 | 22.5 | 400,000 |

TABLE 8

|  | Sample name | Filtrate cation demand | Filtrate turbidity |
|---|---|---|---|
| Example |  |  |  |
| 48 | Sample-23 | 0.012 | 95 |
| 49 | Sample-24 | 0.016 | 110 |
| 50 | Sample-25 | 0.015 | 110 |
| 51 | Sample-26 | 0.014 | 100 |

TABLE 8-continued

| | Sample name | Filtrate cation demand | Filtrate turbidity |
|---|---|---|---|
| 52 | Sample-27 | 0.015 | 105 |
| 53 | Sample-28 | 0.015 | 110 |
| Comparative Example | | | |
| 28 | Comparison-A | 0.027 | 500 |
| 29 | Comparison-B | 0.027 | 480 |

Filtrate cation demand: meg/L
Filtrate turbidity: FAU

TABLE 9

| | Amphoteric water-soluble Polymer | Total retention rate | Inorganic substance retention rate |
|---|---|---|---|
| Example | | | |
| 54 | Sample-1 | 0.015 | 63.2 | 50.1 |
| 55 | Sample-2 | 0.015 | 66.0 | 57.5 |
| 56 | Sample-3 | 0.015 | 67.3 | 60.3 |
| 57 | Sample-4 | 0.015 | 62.0 | 48.5 |
| 58 | Sample-5 | 0.015 | 64.6 | 51.4 |
| 59 | Sample-6 | 0.015 | 66.5 | 58.6 |
| Comparative Example | | | |
| 30 | Comparison-1 | 0.015 | 53.8 | 40.2 |
| 31 | Comparison-2 | 0.015 | 57.3 | 42.4 |
| 32 | Comparison-3 | 0.015 | 58.0 | 42.5 |
| 33 | Comparison-4 | 0.015 | 56.5 | 41.0 |

Total retention rate: wt. %
inorganic substance retention rate: wt. %

TABLE 10

| | Amphoteric water-soluble polymer | Anionic flocculant | Total retention rate | Inorganic substance retention rate |
|---|---|---|---|---|
| Example | | | | |
| 60 | Sample-1 | 0.04 | 0.01 | 63.2 | 50.1 |
| 61 | Sample-2 | 0.04 | 0.01 | 66.0 | 57.5 |
| 62 | Sample-3 | 0.04 | 0.01 | 67.3 | 60.3 |
| 63 | Sample-4 | 0.04 | 0.01 | 62.0 | 48.5 |
| 64 | Sample-5 | 0.04 | 0.01 | 64.6 | 51.4 |
| 65 | Sample-6 | 0.04 | 0.01 | 66.5 | 58.6 |
| Comparative Example | | | | |
| 34 | Comparison-1 | 0.04 | 0.01 | 53.8 | 40.2 |
| 35 | Comparison-2 | 0.04 | 0.01 | 57.3 | 42.4 |
| 36 | Comparison-3 | 0.04 | 0.01 | 58.0 | 42.5 |
| 37 | Comparison-4 | 0.04 | 0.01 | 56.5 | 41.0 |

Total retention rate: wt. %
inorganic substance retention rate: wt. %

What is claimed is:

1. A method for dewatering organic sludge, the method comprising steps of:
dissolving an amphoteric water-soluble polymer dispersion in water;
adding and mixing the resulting solution to and with organic sludge; and
dewatering the sludge by a dewatering apparatus so as to obtain a dewatered cake improved in water content thereof, said amphoteric water-soluble polymer dispersion being an amphoteric water-soluble polymer dispersion containing polymer fine particles having particle diameters of 100 μm or less and produced by dispersion polymerization of a monomer mixture consisting of monomers represented by the following general formulas (1), (2), and (3), and (meth)acrylamide in mole % ratios a, b, c, and d, respectively; satisfying $30 \geq a \geq 5$, $30 \geq b \geq 10$, $50 \geq c \geq 5$, $65 \geq d \geq 0$ and $$0.9 \geq \frac{b}{a+b} \geq 0.5, \text{ and } 3.3 \geq \frac{c}{a+b} \geq 1.1,$$

in the presence of a cross-linking monomer in a mole % ratio of 0.0001 to 0.01 on the basis of the total mole number of the monomer mixture, in an aqueous divalent anionic salt solution in the presence of a polymer dispersant soluble in the aqueous divalent anionic salt solution,

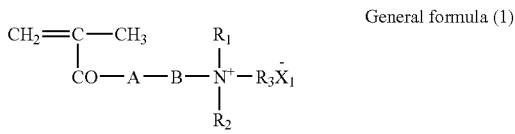
General formula (1)

wherein $R_1$ and $R_2$ independently denote alkyl or alkyloxy having 1 to 3 carbon atoms, or benzyl, R3 denotes hydrogen, or alkyl or alkyloxy having 1 to 3 carbon atoms, or benzyl, they may be similar or dissimilar, A denotes an oxygen atom or NH, B denotes alkylene or alkoxylene having 2 to 4 carbon atoms, and $X_1$ denotes an anion,

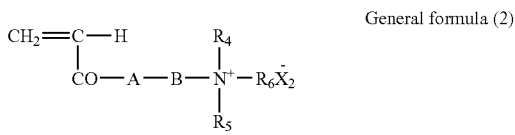
General formula (2)

(wherein $R_4$ and $R_5$ independently denote alkyl or alkyloxy having 1 to 3 carbon atoms, or benzyl, $R_6$ denotes hydrogen, alkyl or alkyloxy having 1 to 3 carbon atoms, or benzyl, they may be similar or dissimilar, A denotes an oxygen atom or NH, B denotes alkylene or alkoxylene having 2 to 4 carbon atoms, and $X_2$ denotes an anion, and

General formula (3)

wherein $R_7$ denotes hydrogen, methyl, or carboxymethyl, $R_8$ denotes hydrogen or carboxy, Q denotes $SO_3$, $C_6H_4SO_3$, $CONHC(CH_3)_2CH_2SO_3$ or COO, and $Y_1$ denotes hydrogen or a cation, and wherein said amphoteric water-soluble polymer has a weight average molecular weight of 100,000 to 20,000,000.

2. The method for dewatering organic sludge of claim 1, wherein an inorganic flocculant is used in combination of said amphoteric water-soluble polymer dispersion.

3. The method for dewatering organic sludge of claim 1, wherein the polymer dispersant is ionic.

4. The method for dewatering organic sludge of claim 3, wherein the ion equivalent of the polymer dispersant is 1.5 to 15 meg/g.

5. The method for dewatering organic sludge of claim 1, wherein the salt of the aqueous divalent anionic salt solution contains at least one kind of polyvalent anionic salt.

6. The method for dewatering organic sludge of claim 1, wherein the range of c is $50 \geqq c \geqq 20$.

7. The method for dewatering organic sludge of claim 1, wherein said amphoteric water-soluble polymer is added in a range of about 0.1 to about 1,000 ppm on the basis of the liquid component.

8. The method for dewatering organic sludge of claim 1, wherein said amphoteric water-soluble polymer is added in a range of about 0.1 to about 3 weight % on the basis of the sludge SS.

* * * * *

UNITED STATES PATENT AND TRADEMARK OFFICE
CERTIFICATE OF CORRECTION

PATENT NO. : 7,250,462 B2  Page 1 of 1
APPLICATION NO. : 10/480392
DATED : July 31, 2007
INVENTOR(S) : Isamu Kubota et al.

It is certified that error appears in the above-identified patent and that said Letters Patent is hereby corrected as shown below:

Column 1, after line 2, please insert the following paragraph:

--This application is a 371 national phase filing of PCT/JP02/05166 filed May 28, 2002, and claims priority to a Japanese application No. 2001-175222 filed June 11, 2001.--;

Column 2, line 28, "flocculent" should read --flocculant--;

Column 2, line 31, "flocculent" should read --flocculant--;

Column 2, line 39, "flocculent" should read --flocculant--;

Column 14, line 35 "Oct. 25, 1944/31" should read --10/25/44/31--; and

Column 17, line 25, "flocculent" should read --flocculant--.

Signed and Sealed this

Sixteenth Day of December, 2008

JON W. DUDAS
*Director of the United States Patent and Trademark Office*